United States Patent
Callewaert et al.

(10) Patent No.: US 12,481,753 B1
(45) Date of Patent: Nov. 25, 2025

(54) CYBER PROTECTION AUTOMATION WITH SECURE PHYSICAL VAULT

(71) Applicant: Dell Products, L.P., Hopkinton, MA (US)

(72) Inventors: Peter Callewaert, Eernegem (BE); Dennis J. Trulli, Jr., Hudson, MA (US); Paul Linstead, Shrewsbury, MA (US); David Goncalves, Acushnet, MA (US); Melissa Flynn, North Attleboro, MA (US); Brett Quinn, Cotuit, MA (US); Kevin Heasley, Dewey, AZ (US)

(73) Assignee: Dell Products, L.P., Hopkinton, MA (US)

( * ) Notice: Subject to any disclaimer, the term of this patent is extended or adjusted under 35 U.S.C. 154(b) by 19 days.

(21) Appl. No.: 18/794,036

(22) Filed: Aug. 5, 2024

(51) Int. Cl.
  *G06F 21/54* (2013.01)
  *G06F 21/00* (2013.01)
  *G06F 21/44* (2013.01)
  *G06F 21/78* (2013.01)

(52) U.S. Cl.
  CPC .............. *G06F 21/54* (2013.01); *G06F 21/78* (2013.01); *G06F 21/00* (2013.01); *G06F 21/44* (2013.01)

(58) Field of Classification Search
  CPC .......... G06F 21/54; G06F 21/78; G06F 21/44; G06F 21/00
  USPC .......................................................... 726/26
  See application file for complete search history.

(56) References Cited

U.S. PATENT DOCUMENTS

| | | | |
|---|---|---|---|
| 9,720,700 B1* | 8/2017 | Brown | G06F 21/31 |
| 12,056,263 B2* | 8/2024 | Agrawal | G06F 21/604 |
| 2005/0047594 A1* | 3/2005 | Cho | G06F 21/80 380/59 |
| 2012/0189111 A1* | 7/2012 | Siminoff | H04M 3/42059 379/201.01 |
| 2013/0201407 A1* | 8/2013 | Parker | H04N 21/485 345/163 |
| 2020/0161114 A1* | 5/2020 | Watanabe | H01J 49/0036 |
| 2021/0382996 A1* | 12/2021 | Jeansonne | H04L 9/0825 |
| 2022/0101702 A1* | 3/2022 | Olsen | G08B 13/06 |

* cited by examiner

*Primary Examiner* — Thanh T Le
(74) *Attorney, Agent, or Firm* — Anderson Gorecki LLP

(57) ABSTRACT

A secure physical vault is used in connection with cyber protection automation to ensure that initial configuration and all configuration changes to the cyber protection environment are only implemented by a host that is locally physically connected to the cyber vault. By requiring the host to be locally physically connected to the cyber vault, it is possible to prevent remote modifications to the cyber protection environment configuration, thus preventing a remote attack on the cyber protection afforded by the cyber protection environment. The Operating System of a storage system implementing the cyber vault may be flagged to prevent any syscall from being processed that is not received from a host that is locally physically connected to the cyber vault. Host controller software can also be used to ensure that the initial configuration and all configuration changes to the cyber protection environment configuration are only processed if locally received.

18 Claims, 10 Drawing Sheets

CYBER PROTECTION AUTOMATION WITH SECURE PHYSICAL VAULT

FIELD

This disclosure relates to computing systems and related devices and methods, and, more particularly, to cyber protection automation with a secure physical vault.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a secure physical vault is used in connection with cyber protection automation to ensure that the initial configuration and configuration changes to a cyber protection environment are only implemented by a host that is locally physically connected to the cyber vault. By ensuring that the initial configuration and configuration changes to the cyber protection environment are only implemented by a host that is locally physically connected to the cyber vault, it is possible to prevent remote modifications to the cyber protection environment configuration, thus preventing a remote attack on the cyber protection afforded by the cyber protection environment.

In some embodiments, host controller software is implemented in the cyber vault that ensures that the initial cyber protection environment configuration and configuration changes are only implemented by a host that is locally physically connected to the cyber vault. In some embodiments, the host controller software is configured to inspect the origination of system calls associated with cyber protection environment configuration instructions. In response to a determination that a system call that is related to cyber protection environment configuration was presented to the storage system implementing the cyber vault from a host that is locally physically connected to the cyber vault, the system call is allowed to be processed. In response to a determination that the system call was not from a host that is locally physically connected to the cyber vault, the system call is blocked from being processed. In this manner, system calls that relate to the cyber protection environment and do not identify a host that is locally physically connected to the storage system implementing the cyber vault are not processed in the cyber vault, to thus prevent remotely presented configuration changes from affecting the cyber protection environment configuration within the secure physical vault.

In some embodiments, the host controller software also blocks command line interface (CLI) commands received over an RDF link from running on the cyber vault. In some embodiments, CLI commands may be received by a cyber vault on an RDF link from a host that is physically connected to the production system on the other end of the RDF link. By preventing CLI commands received over an RDF link from being processed in the cyber vault, it is possible to ensure that these types of commands are not able to be used to affect the cyber protection environment configuration.

In some embodiments, an operating system on the storage system is physically configured with a flag identifying the storage system as implementing a cyber protection vault. The flag is not able to be changed using software, thus preventing any attempt to locally or remotely diminish the cyber protection afforded by the storage system. The flag requires the operating system to not process any system calls (syscalls), including syscalls unrelated to cyber protection, unless the syscalls are determined to originate at a host that is locally physically connected to the cyber vault. Likewise, the flag requires the operating system to not process any command line interface (CLI) commands received on the RDF links. By preventing CLI commands received over the RDF links and syscalls originating at hosts that are not locally physically connected to the cyber vault from being processed by the storage system, the operating system in use on the storage system implementing the cyber vault can prevent external attempts to alter operation of the storage system implementing the cyber vault, as well as preventing external attempts to alter the cyber protection environment configuration provided by the secure physical vault.

In some embodiments, a method of implementing cyber protection automation using a secure cyber vault, includes receiving an instruction by a storage system implementing the secure cyber vault, determining, by the storage system, whether a flag is set on the storage system designating the storage system as configured to implement the secure cyber vault, and determining, by the storage system, an origin of the instruction, the origin of the instruction specifying whether the instruction was received from a host that is locally physically attached to the storage system or not locally physically attached to the storage system. In response to a determination that the flag is set on the storage system that designates the storage system as configured to implement the secure cyber vault, and in response to determination that the origin of the instruction was from the host that is not locally physically attached to the storage system, denying the instruction and not processing the instruction by the storage system. In response to a determination that the flag is set on the storage system that designates the storage system as configured to implement the secure cyber vault, and in response to determination that the origin of the instruction was from the host that is locally physically attached to the storage system, allowing the instruction and processing the instruction by the storage system.

In some embodiments, the flag is not able to be changed by software. In some embodiments, the instruction received by the cyber vault is a system call (syscall). In some embodiments, the instruction received by the cyber vault is a CLI command received over an RDF link. In some embodiments, the instruction is related to creation or modification of a cyber protection environment configuration of the cyber protection automation provided by the secure cyber vault. In some embodiments, the instruction is unrelated to creation or modification of a cyber protection environment configuration of the cyber protection automation provided by the secure cyber vault.

In some embodiments, in response to a determination that the flag is not set on the storage system that designates the storage system as configured to implement the secure cyber vault, the method further includes determining whether the instruction is related to creation or modification of a cyber protection environment configuration of the cyber protection automation provided by the secure cyber vault. In response to a determination that the instruction is related to creation or modification of the cyber protection environment configuration of the cyber protection automation provided by the secure cyber vault, and in response to determination that the origin of the instruction was from the host that is locally physically attached to the storage system, allowing the instruction and processing the instruction by the storage system. In response to a determination that the instruction is related to creation or modification of the cyber protection environment configuration of the cyber protection automation provided by the secure cyber vault, and in response to determination that the origin of the instruction was not from the host that is locally physically attached to the storage system, denying the instruction and not processing the instruction by the storage system. In response to a determination that the instruction is not related to creation or modification of the cyber protection environment configuration of the cyber protection automation provided by the secure cyber vault, allowing the instruction and processing the instruction by the storage system.

In some embodiments, determining, by the storage system, the origin of the instruction includes determining whether the host is connected to the storage system using a physical cable or a wireless communication technology, and the host will be determined to be locally physically attached to the storage system when the host is connected to the storage system using the physical cable, and will be determined to be not locally physically attached to the storage system when the host is connected to the storage system using the wireless communication technology.

In some embodiments, the method further includes alternately opening and closing an airgap on one or more remote data forwarding links by turning the remote data forwarding links online and offline, respectively, by software executing on the storage system implementing the cyber vault.

In some embodiments, the method further includes implementing the cyber protection environment by software executing on the storage system implementing the cyber vault according to the configuration of the cyber protection automation provided by the secure cyber vault.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
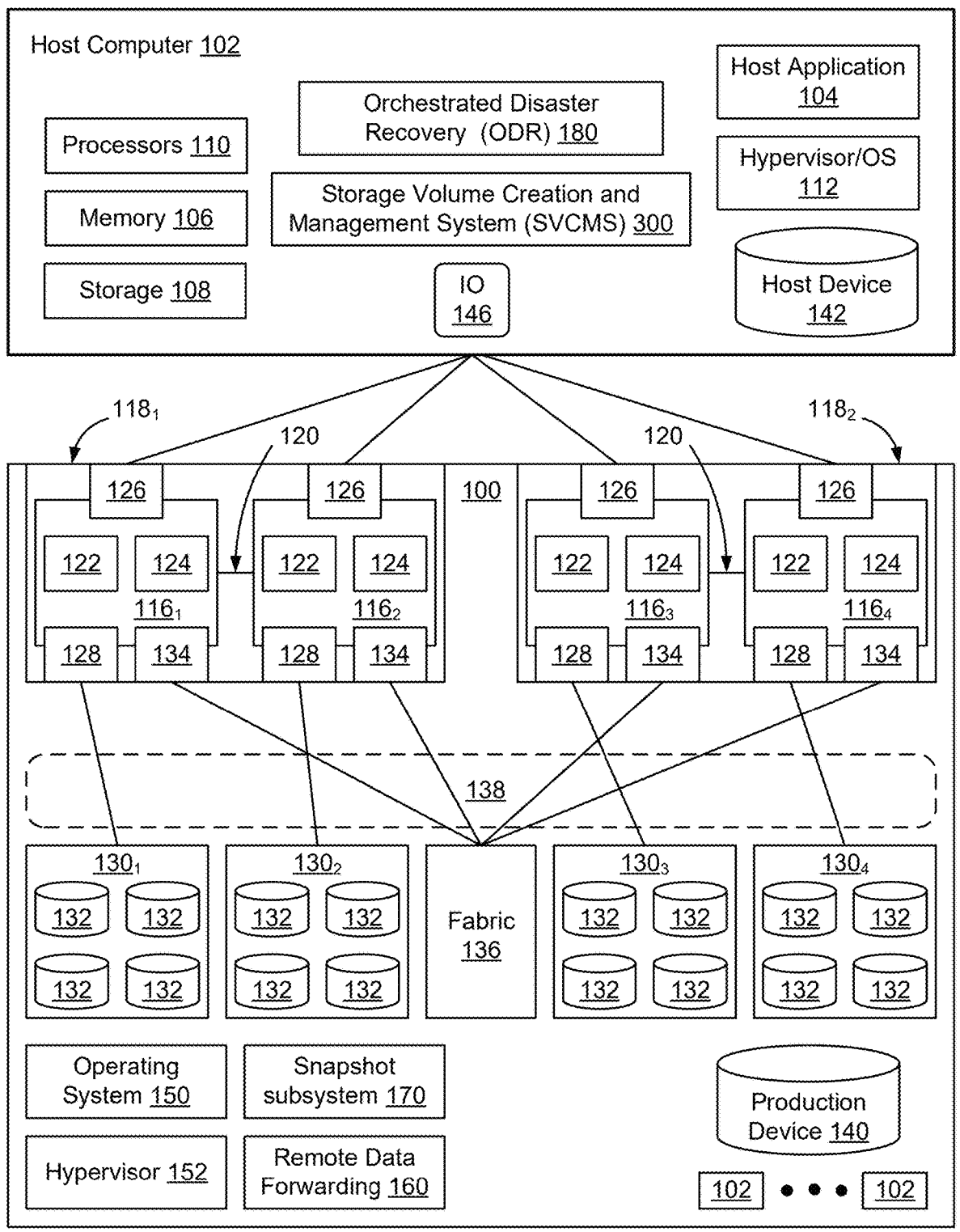
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g., ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g., ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. In some implementations, from the perspective of the host application 104, the host device 142 is a single data storage device having a set of contiguous fixed-size LBAs (Logical Block Addresses) on which data used by the host application 104 resides and can be stored. The data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host local volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data at the production device 140 to a location to which the block is written on the managed drives 132.

Hosts 102, such as mainframe (zOS) computer systems, store data using storage resources of the storage systems 100. Software, such as an Orchestrated Disaster Recovery (ODR) application 180 is used to automate, react, and monitor large scale mainframe and mixed mainframe-open systems environments, to provide continuous operations or automated failover during planned or unplanned events. One example commercially available ODR application 180 is referred to as Geographically Dispersed Disaster Recovery (GDDR) which is available from Dell™, although the techniques described herein can be used in connection with other forms of ODR applications 180. Accordingly, although some embodiments will be described using GDDR as an example implementation of an ODR application 180, it should be understood that the techniques described herein for automated orchestration of cyber protection can be used in other environments as well.

In some embodiments, ODR application 180 is a mainframe software product that automates business recovery procedures by reacting to events that its monitoring capability detects in a data center. Because the ODR application 180 is designed to provide system restart following disasters, ODR application 180 does not reside in the same systems that it is seeking to protect. Rather, ODR application 180 resides on separate logical partitions from those that run application workloads.

In some embodiments, ODR application 180 works in connection with remote data forwarding subsystem 160 of storage system 100 to create replication facilities between pairs of similarly configured storage systems 100. Replication of data on a replication facility will be referred to herein as remote data forwarding (RDF). The set of storage systems configured to implement remote data forwarding is referred to herein as a data replication facility. As described in greater detail herein, in some embodiments one of the storage systems that is configured to implement cyber protection includes a snapshot subsystem configured to create point in time copies of storage volumes. A snapshot of a storage volume, such as production device 140, is point-in-time copy of the storage volume as the storage volume existed at the time that the snapshot was created.

In some embodiments, host computer runs a mainframe software application configured to manage creation and management of storage volumes and to interact with the storage systems 100 that are providing storage resources to the host computer 102 to ensure that the storage systems 100 are correctly configured to provide continuous data protection for mainframe data assets. For example, as shown in FIG. 1, in some embodiments the host computer includes Storage Volume Creation and Management System (SVCMS) 190 that is configured to interact with storage system 100 to cause the snapshot subsystem 170 of storage system 100 to create snapshots of storage volumes that are used by host computer 102 and are stored in the cyber vault on a regular cadence.

In some embodiments, SVCMS 190 interacts with the storage system 100 that is implementing the cyber vault to create a versioned data group of the storage volumes that are contained in the cyber vault that are to be backed up. SVCMS 190 also interacts with the snapshot subsystem 170 of the storage system 100 in the cyber vault CRy to cause the snapshot subsystem 170 to create snapsets (groups of snapshots) of the storage volumes of the versioned data group. In this way, the mainframe host 102 can control creation of snapsets of volumes of data by the snapshot subsystem 170 within the cyber vault, to create point in time recovery points of the set of storage volumes stored in the cyber vault.

In some embodiments, as shown in FIG. 1, one application that may be executing at storage system 100 is a Remote Data Forwarding (RDF) application process 160, which causes selected storage volumes to be mirrored by the storage system 100 to one or more similar backup storage systems 100.

It is possible for a primary storage system 100 (R1) to perform data replication to a backup storage system 100 (R2) where the storage systems 100 are compatible and properly configured. The RDF application 160, when executed at storage system 100, enables the storage system 100 to participate in storage system level data replication between sets of mirroring pairs of storage systems 100. A set of storage systems 100 that are configured for data to be mirrored from a primary storage system 100 (R1) to a backup storage system 100 (R2) will be referred to herein as a "data replication facility". A given storage system, such as storage system 100, may operate as a primary storage system R1 or as a backup storage system R2 in many mirroring pairs, and hence multiple RDF applications 160 may simultaneously execute at storage system 100 to control participation of the storage system 100 in the mirroring operations.

Data transfer among storage systems, including transfers between storage systems 100 for data replication (mirroring) functions, may take place in several ways depending on how the primary storage system R1 handles data written by the host 102 and how the backup storage system R2 acknowledges receipt of data on the data replication facility. Three example data mirroring modes will be referred to herein as synchronous (RDF/S), asynchronous (RDF/A), and Adaptive Copy Disk (ADCOPY-DISK).

In the synchronous data replication mode (RDF/S), data is transmitted from a primary storage system R1 to a backup storage system R2 as the data is received from a host 102, and an acknowledgement of a successful write is transmitted by the backup storage system R2 synchronously with the completion thereof. To maintain a synchronous relationship between the primary storage system R1 and the backup storage system R2, each IO from the host 102 is forwarded by the primary storage system R1 to the backup storage system R2 as it is received from host 102, and the primary storage system R1 will wait for an acknowledgment from the backup storage system R2 before issuing a subsequent IO from the host 102.

In the asynchronous data replication mode (RDF/A), when data is received from the host 102, the data is written to the primary storage system R1 and a data transfer process is initiated to write the data to the backup storage system R2 on the data replication facility. The primary storage system R1 acknowledges the write operation to the host 102 before the primary storage system R1 has received an acknowledgement that the data has been received by the backup storage system R2. The use of asynchronous data replication enables the data on the primary storage system R1 and backup storage system R2 to be one or more cycles out of synchronization, because the primary storage system R1 will continue to execute IOs prior to receipt of acknowledgments from the backup storage system R2. The use of asynchronous replication may be beneficial in connection with sites located geographically distant from each other, for example where the distance between the primary storage system R1 and the backup storage system R2 is such that waiting for an acknowledgement from the backup storage system R2 would take considerable time and, hence, reduce responsiveness of the primary storage system R1 to the data client 110.

Adaptive Copy Disk (ADCOPY-DISK) data replication mode, as that term is used herein, refers to an asynchronous type of data replication in which data is transmitted from the primary storage system R1 to the backup storage system R2 using a best-efforts type of data replication between the storage systems. In ADCOPY-DISK, the data on the backup storage system R2 may be more than one IO out of synchronization with the primary storage system R1 and, accordingly, data consistency at the backup storage system R2 is not guaranteed. ADCOPY-DISK enables bulk copy operations to be implemented between the primary storage system R1 and the backup storage system R2, for example when there are many tracks to synchronize between the two storage systems.

Figure 2:
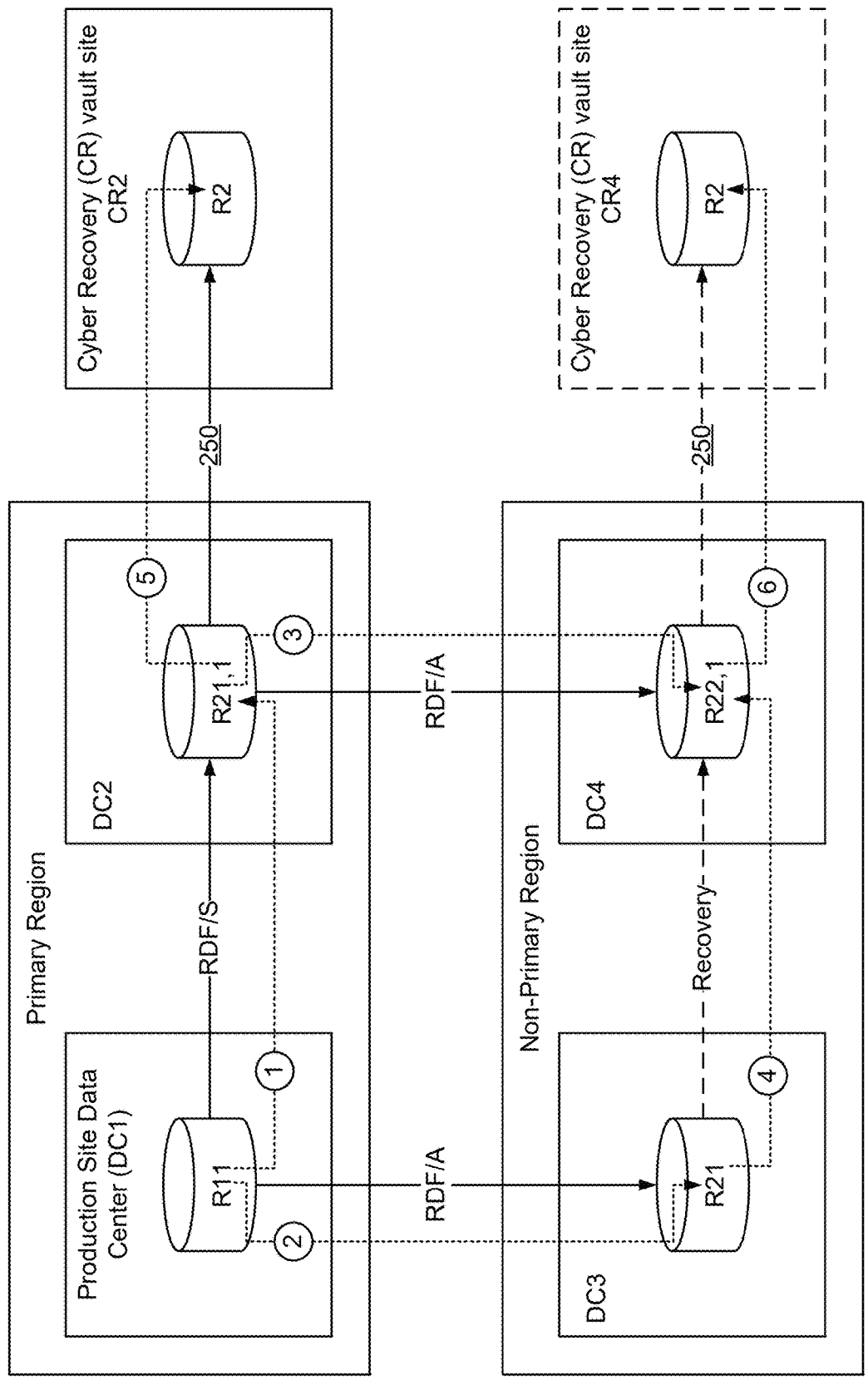
FIG. 2 is a block diagram of a storage environment including four Data Centers (DC) arranged in a square data replication facility, and including one or more Cyber Recovery (CR) vault sites, according to some embodiments.

There are many types of data replication facilities that may be created, which may have different topographies depending on the number of data centers and the manner in which data is configured to be replicated between the data centers. For example, FIG. 2 is a block diagram of a storage environment including four Data Centers (DC1, DC2, DC3, and DC4) that are arranged in a square data replication facility that also includes one or more Cyber Recovery (CR) vault sites, according to some embodiments. Although some embodiments are described herein in which the data replication facility is implemented using a square topography, it should be understood that other topographies may be used as well depending on the particular implementation.

In the nomenclature adopted in the figures, the letter "R" is used to refer to one or more storage volumes that has been included in a data replication facility, such that data that is written to one or more of the storage volumes will be replicated on the data replication facility. The numbers following the letter R indicate if the storage volume is a source (designated by a number 1) or a receiver (designated by the number 2). In FIG. 2, the square topography of the data replication facility includes a first pair of data centers, DC1 and DC2, in a primary region and a second pair of data centers, DC3 and DC4, in a non-primary region.

In the data replication facility shown in FIG. 2, production site data center DC1 is the source (R11) on both a first replication session to data center DC2 (Arrow 1) and on a second replication session to data center DC3 (Arrow 2). Synchronous replication is used to replicate data between the data centers in the primary region (on Arrow 1 from DC1 to DC2) and asynchronous data replication RDF/A is used to replicate data between the primary and non-primary regions (on Arrow 2 from DC1 to DC3). DC2 likewise replicates data received from DC1 in a cascaded manner to DC4 over an asynchronous data replication session (Arrow 3). Further, within the non-primary region, a recovery leg is implemented between DC3 and DC4 and, as such, no replication is running between these two sites normally (Arrow 4). Hence, in FIG. 2, the square data replication facility includes the following data replication sessions:

DC1→DC2 (Arrow 1: synchronous remote data forwarding RDF/S)
DC1→DC3 (Arrow 2: asynchronous remote data forwarding RDF/A)
DC2→DC4 (Arrow 3: asynchronous remote data forwarding RDF/A)
DC3→DC4 (Arrow 4: Recovery leg)

In some embodiments, orchestrated disaster recovery application 180 is used to configure the data replication facility to enable data to be mirrored between storage systems DC1, DC2, DC3, and DC4 so that, in the event of a failure of one of the storage systems, the data remains available at one or more of the other storage systems. It should be noted that the same set of storage volumes, that originate at DC1, are replicated on each of the replication sessions (arrows 1, 2, and 3). In the event of a failure, the orchestrated disaster recovery application 180 enables failover from one storage system to another of the storage systems of the data replication facility. Although FIG. 2 shows a square-shaped data replication facility, it should be understood that data replication facilities can have different numbers of storage systems and different architectures depending on the implementation.

In FIG. 2, a Cyber Recovery (CR) vault site is connected by a replication facility (arrow 5) with one of the production sites DC2, which is the source of production data that is to be protected using the cyber vault CR2. In FIG. 2, production site DC2 is connected by a replication data facility (arrow 5) to a cyber vault CR2, although cyber vault CR2 may be connected to any production site DCx. In some embodiments, Cyber Protection Automation (CPA) is implemented using Orchestrated Disaster Recovery application 180, to create copies of data at a cyber vault site CRy that can be used for cyber recovery, for example in instances where the data maintained by the storage systems implementing the data replication facility is corrupted in a malware attack. In some embodiments, the storage volume creation and management system (SVCMS) 300 is used to create regular snapsets at the cyber vault CR2, which is a physically separate, possibly airgapped, cyber vault CR2 using a Cyber Protection Automation (CPA) process. Likewise, in FIG. 2, production site DC4 is connected by a replication data facility (arrow 6) to a second cyber vault CR4, although the second cyber vault CR4 may be connected to any production site DCx. In embodiments where cascaded asynchronous data replication is not allowed, data may be forwarded to cyber vault CR4 using ADCOPY-DISK.

An airgap, as that term is used herein, refers to the relative isolation of the storage system implementing the cyber vault CRy from the production site DCx. As shown in FIG. 2, in some embodiments the production site DCx and cyber vault CRy 205 are connected by RDF links 250. In an airgapped solution, these RDF links 250 are normally offline, making data flow impossible. When an airgap connection is enabled, data flow is possible and the RDF links are online. When an airgap connection is disabled, data flow is not possible because the RDF links are offline. By using an airgap, it is possible to physically isolate the cyber vault CRy from the production sites DCx of the data replication facility. In some embodiments, as described in greater detail herein, the cyber vault CRy controls the state of the airgap to selectively toggle the RDF links 250 between online and offline states.

There are several ways of creating snapshots of a set of production volumes in the cyber vault. For example, in U.S. Pat. No. 11,580,065, entitled Automated Orchestration of Cyber Protection of a Set of Storage Volumes, a process of protecting storage volumes is described that includes creation of snapsets of the storage volumes at the production sites DCx, linking the snapsets to a set of target devices, and then transmitting the snapshot data from the linked target devices to the cyber vault to enable the snapsets to be stored in the cyber vault CRy. The content of U.S. Pat. No. 11,580,065 is hereby incorporated herein by reference in its entirety. In U.S. patent application Ser. Nos. 18/632,514, and 18/655,449, various methods of creating snapshots of the storage volumes directly in the cyber vault CRy are described. The content of each of these patent applications is hereby incorporated by reference in their entirety. By directly creating snapsets from the R2 devices in the cyber vault CRy, it is possible to avoid creating corresponding snapsets at the production sites, thus saving both storage space and processing resources at the production sites.

Figure 3:
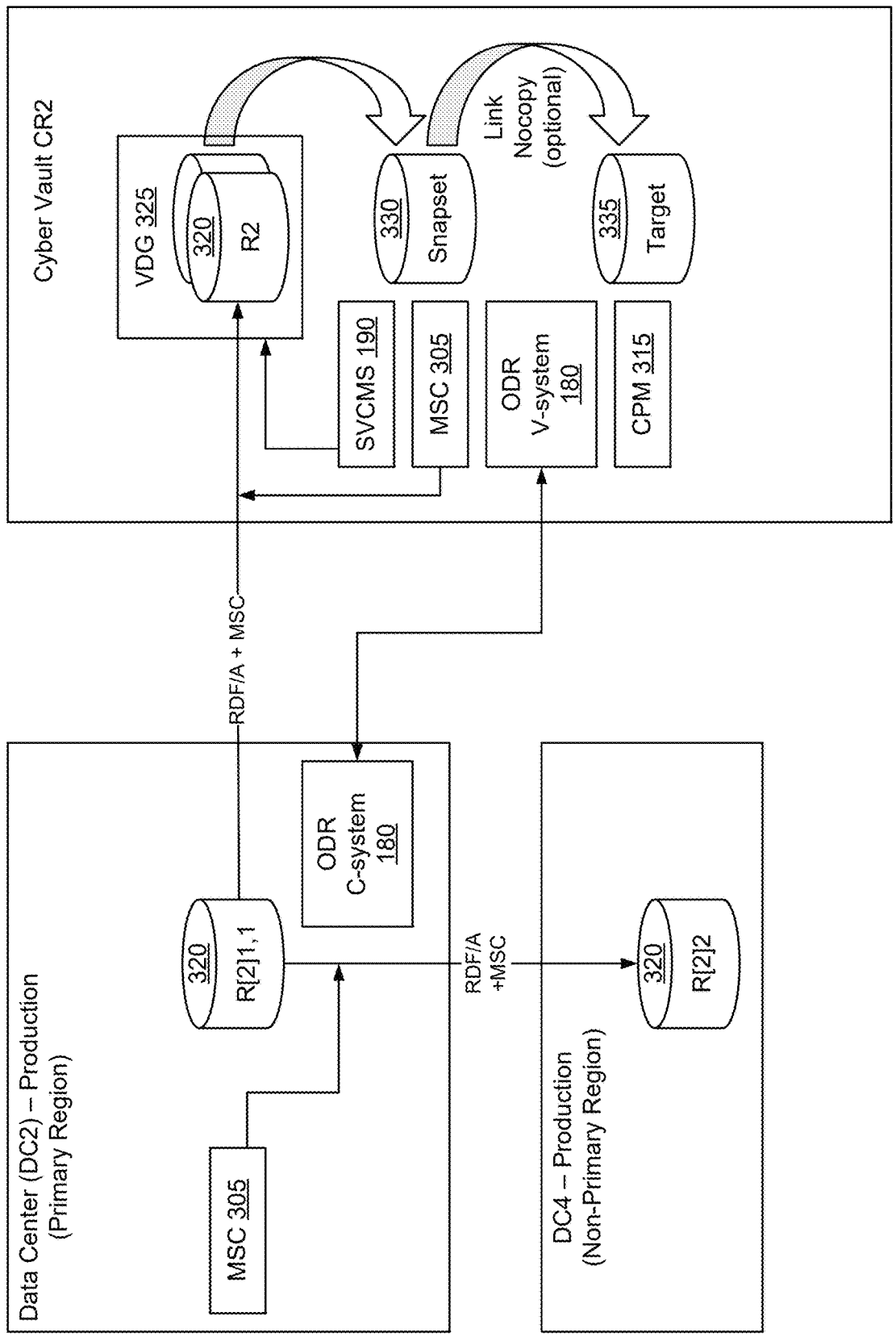
FIG. 3 is a block diagram of a portion of the storage environment of FIG. 2, showing replication of data from a source data center DC2 in a primary region to a data center DC4 in a non-primary region, and showing replication of data from the source data center DC2 in the primary region to a Cyber Vault CR2, according to some embodiments.

FIG. 3 is a block diagram of a portion of the storage environment of FIG. 2, showing replication of data from a source data center DC2 in a primary region to a data center DC4 in a non-primary region, and showing replication of data from the source data center DC2 in the primary region to a Cyber Vault CR2, according to some embodiments.

In particular, FIG. 3 shows a space-saving cyber protection automation implementation, in which Cyber Protection Manager (CPM) 315 is providing cyber protection for the data volumes 320, in the primary region of a data replication facility configured using a square configuration using a single vault site (CR2). When DC2 is in the primary region, as shown in FIG. 3, the CPM operates in the MSC-based modality, ensuring that DC2→CR2 replication is active in RDF/A (Asynchronous remote data forwarding), and the MSC application 305 ensures that the data of the storage volumes in the cyber vault are globally consistent with the storage volumes 320 at the production data center DC2 at the time of creation of the snapsets at CR2. SVCMS 190 creates consistent snapsets at CR2 at a regular pace determined by the state of an airgap on links 250 or according to a specified snapshot creation interval or schedule.

In existing cyber protection automation scenarios, an Orchestrated Disaster Recovery (ODR) application cyber protection manager is run outside of the cyber vault CRy that is used to configure the cyber protection within the cyber vault CRy. This exposes the possibility that a rogue actor, outside of the vault, could compromise the cyber protection automation itself, for example by changing the configuration of the cyber protection environment. The cyber vault is connected by RDF links to the production site, either continuously, or periodically when an airgap is used to intermittently connect the cyber vault to the production site to synchronize data to the cyber vault. When the RDF links are on-line, configuration changes from outside the cyber vault may be made to the cyber protection environment configuration within the vault, for example by exploiting the RDF links, to thereby compromise the integrity of the cyber protection environment configuration within the cyber vault. There is thus a concern that a rogue actor outside of the vault could exploit the RDF links when online to interfere with or destroy the cyber protection offered by the vault (i.e., the integrity of the snapsets residing there).

According to some embodiments, two new configurations are provided for cyber protection automation. One is implemented purely in host software. The second one requires additional changes to the storage system operating system. In both embodiments, the initial cyber protection environment configuration and all cyber protection environment configuration changes are required to be implemented by a host that is locally physically connected to the storage system implementing the cyber vault. By ensuring that the initial configuration and configuration changes to the cyber protection environment are only implemented by a host that is locally physically connected to the cyber vault, it is possible to prevent the RDF links from being used as an attack vector, thus providing additional security to the cyber vault by preventing external cyber protection environment configuration modification actions. In the Operating System based embodiment, only system calls that are received from a host that is locally physically connected to the storage system will be processed. Obtaining physical access to the storage system implementing the cyber vault thus provides an additional layer of security, to enhance resiliency of the cyber protection environment from external intrusion attempts.

In some embodiments, the host software based secure vault configuration requires compute inside the vault and has cyber protection automation running entirely from within the vault. This enables the cyber protection automation to benefit from the safety of the secure physical vault, and prevents outside actors from attacking the cyber protection automation itself. In some embodiments, the host-based secure vault solution requires the initial configuration and all configuration changes to the cyber protection environment established by the CPM to be implemented via a host that is locally physically connected to the storage system implementing the cyber vault CRy. The host-based secure vault configuration also provides complete airgap management within the Orchestrated Disaster Recovery (ODR) application executing in the cyber vault CRy on an interval or schedule defined by the customer, without the cost of a separate airgap management server and the associated software, services, and maintenance. Previous solutions enabled ODR running outside of the cyber vault to create an airgap by turning off the RDF links. However, the externally running instance of ODR was not allowed to turn off the airgap by activating the RDF links, since this would pose a security risk. By running an instance of Orchestrated Disaster Recovery (ODR) application on compute resources that are locally attached to the cyber vault CRy, it is possible to implement full airgap management within ODR thus obviating the need for a separate airgap management software application or airgap management server.

The storage system Operating System (OS) secure vault configuration implements the same type of protection as the host-based software solution, by configuring the operating system of the storage system to enforce the requirement that the initial configuration and all configuration changes to the cyber protection environment established by the CPM are implemented by a host that is locally physically connected to the storage system implementing the cyber vault CRy. In some embodiments, the operating system enables the storage system to be designated as a cyber vault, such that the cyber vault is not able to be affected by configuration commands that originate outside of the cyber vault. Specifically, in some embodiments the cyber flag causes the storage system operating system to not process any CLI commands received over the RDF links or any syscall that is not received from a host that is locally physically connected to the storage system implementing the cyber vault CRy. By preventing the operating system from processing any syscall or command that is not from a host that is locally physically connected to the storage system, it is possible to prevent outside actors from affecting operation of the cyber vault. The OS version thus provides an effectively airgapped vault (without requiring use of an actual airgap), and hence enables creation of the finest granularity of consistent point-in-time data copies. Further the OS version enables RDF groups and RDF links to be secured in such a way that they could be allowed to be permanently online without endangering the airgap quality.

In both the host-based and OS-based secure vault configurations, the only connections between DCx and CRy are the RDF links between the production system DCx and the cyber vault CRy, and a TCP/IP connection between the instance of ODR running at the host at DCx and an instance of ODR running at the host at CRy.

In the OS-based secure vault configuration, the RDF links between the production site DCx and the vault site CRy are secured by the operating system of the storage system implementing the vault site CRy. Specifically, in some embodiments the storage system in the vault will be configured in the factory with a flag (referred to herein as a CYB flag) labeling it as a cyber vault storage system. This CYB flag cannot be removed using software. Any modifications to this CYB flag require physical access to the vault storage system. In some embodiments, RDF groups in a vault storage system can only be created from a host that has direct channel attachment to the vault storage system, e.g., by a host that is locally physically connected to the storage system.

Figure 5:
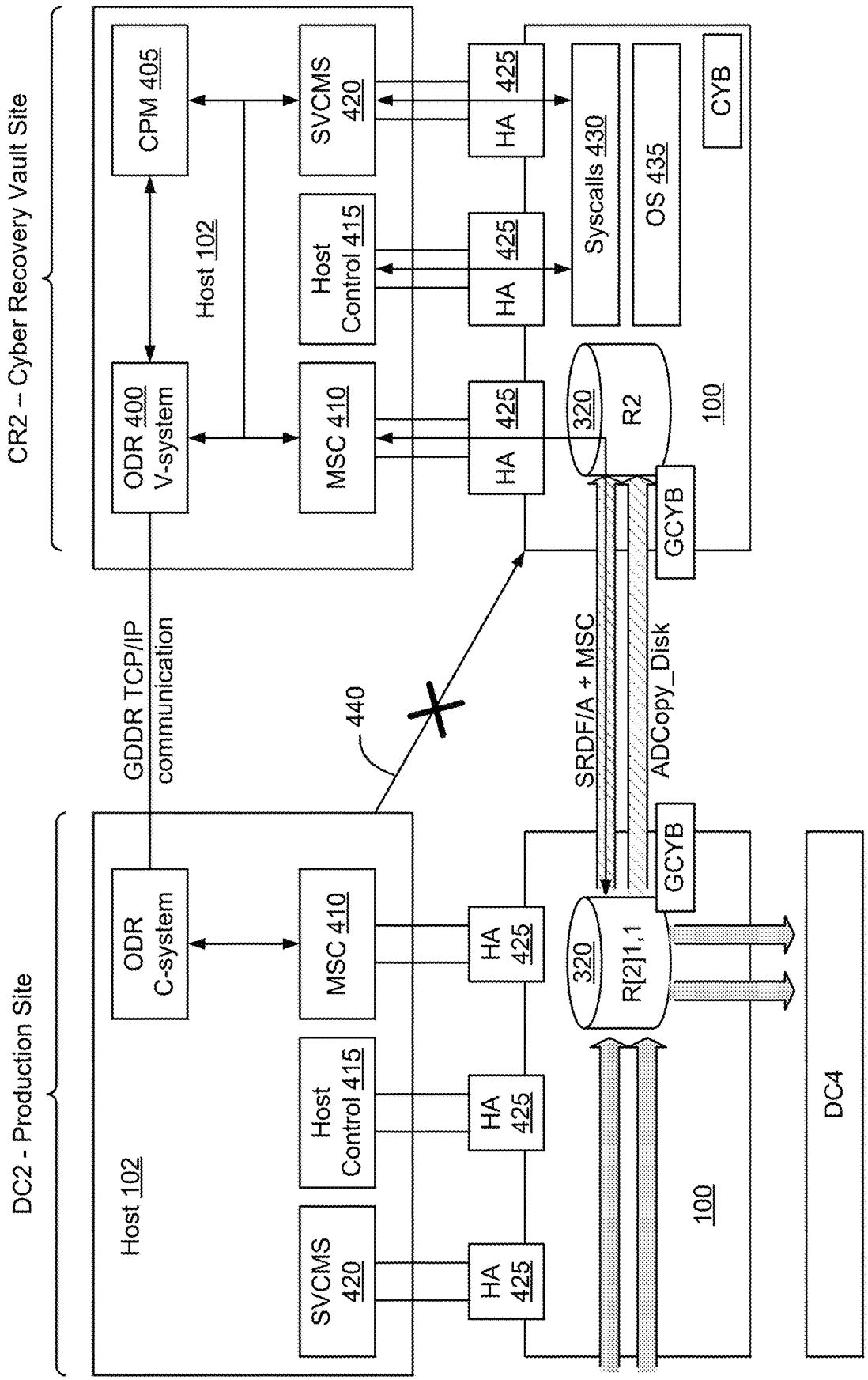
FIG. 5 is a block diagram of a portion of the storage environment of FIG. 3, showing the production site DC2 and cyber vault CR2, and showing software components implemented in the cyber vault to implement a storage system Operating System based secure physical vault, according to some embodiments.

In some embodiments, RDF groups in a vault storage system must also have a vault flag (referred to herein as a Group CYB flag or GCYB flag) at both ends. For example, in some embodiments as shown in FIG. 5 an RDF group cyber flag GCYB is added to the set of RDF links at both the production site DC2 and in the vault site CR2. By flagging these links as secure, it is possible to prevent any modification of the links from outside of the cyber vault, for example to prevent the RDF links from being disabled at the production site DC2. Additionally, any modifications to these GCYB flags require physical access to the vault storage system. In some embodiments, any state changes to RDF groups, devices in those RDF groups, or directors supporting those RDF groups can only be done from a host that is locally physically connected to the vault storage system. This includes all RDF state-changing commands (e.g., commands related to RDF volumes). It also includes local replication commands that could lead to increased Storage Resource Pool (SRP) resource consumption (e.g., snapshot activation or linking of snapsets), or that could corrupt the data in the cyber protection automation source devices (e.g., linking of snapshots to the cyber protection automation source devices). Although the cyber flag will be referred to herein as CYB and GCYB, it should be understood that the particular names of the flags will depend on the particular implementation.

In some embodiments, the cyber flag CYB is set on the storage system by the storage system manufacturer when the storage system is built. The cyber flag CYB is not settable/resettable by software, but rather requires physical access to the hardware to change. For example, a jumper or DIP switch may be set during the manufacturing process to designate the storage system as a cyber vault. Alternatively or additionally, the CYB flag may be set as part of the Basic Input Output System (BIOS) that is programmed into the hardware of the storage system. Importantly, the CYB flag applies to the storage system as a whole—in some embodiments a given storage system is not used as both a cyber vault and as a production device.

In some embodiments, the CYB flag requires the operating system to not process any system calls (syscalls), including syscalls unrelated to cyber protection, unless the syscalls are determined to originate at a host that is locally physically connected to the cyber vault. By preventing syscalls originating at hosts that are not locally physically connected to the cyber vault from being processed by the storage system, the operating system in use on the storage system implementing the cyber vault can prevent external attempts to alter the cyber protection environment configuration or make other changes to the storage system, which could result in compromising the integrity of the cyber protection afforded by the cyber vault.

The production site, DCx, is a regular ODR production site as part of any ODR configuration. In some embodiments, ODR runs at the production site as a control system (C-system). The production site houses the Storage Volume Creation and Management System (SVCMS) source devices 320 included in the cyber RDF groups. It supports all documented ODR features, including Versioned Data Group (VDG) protection for the RDF source devices 320. In the examples shown in the FIGS. 4 and 5, the source devices 320 are the target of RDF/S, RDF/A under control of Multi-Session Consistency (MSC) as part of the ODR-managed leg, or ADCOPY-DISK as part of the external long-distance leg, and the source of either MSC-controlled RDF/A or ADCOPY-DISK in their role as SVCMS source devices 320. In the OS-based secure vault configuration, as a result of the securing of the cyber RDF links, state changes in the cyber mirror of these devices are prohibited by the operating system, and these devices also cannot be the target of local replication.

As used herein, CRy is the vault site. The cyber vault CRy houses the cyber protection automation target devices. In the OS-based secure vault configuration, these devices are housed in a storage system that has the CYB flag and are configured in RDF groups that have the GCYB flag. Both the host-based and OS-based secure vault configurations require a host to reside inside the cyber vault and to be locally physically connected to the cyber vault, for example by having direct channel attachment to the storage system implementing the cyber vault. This host is required in order to perform cyber protection management and any state changes that affect devices in the cyber RDF groups.

In some embodiments, an instance of Orchestrated Disaster Recovery (ODR) such as Geographically Dispersed Disaster Restart (GDDR) is run in the cyber vault CRy. ODR that is configured to run in the cyber vault will be referred to herein as a Vault system, or V-system. An instance of ODR running at a production site will be referred to herein as a Production-system or P-system. An instance of ODR running as a control system will be referred to herein as a C-system. In some embodiments, the instance of ODR that executes at the cyber vault is configured to recognize that it is running in a vault site and is configured such that it can only execute in a cyber vault site. In some embodiments, the instance of ODR executing in the cyber vault CRy is configured to regularly exchange configuration and state information with ODR running at the production site, in order to determine which space-saving cyber protection automation modality is being implemented on the RDF links. Example modalities include asynchronous RDF (RDF/A) with MSC, and ADCOPY-DISK. In some embodiments, the instance of ODR running in the cyber vault CRy has a reduced component set as compared to the instance of ODR running at the production site.

In some embodiments, if the instance of ODR running in the cyber vault CRy detects that the local system is part of a cyber protection automation implementation that has Cyber Protection Manager (CPM) defined to run on a V-system, then ODR running on a V-system or C-system will repeatedly issue warning messages if it observes that the same host has direct channel attachment to both a production storage system DCx and a cyber protection automation vault storage system CRy, because that would reduce security of the vault solution.

In some embodiments, if ODR detects that the local system is part of a cyber protection automation implementation that has Cyber Protection Manager (CPM) defined to run in the cyber vault CRy, the local instance of ODR will start CPM on the V-system at cyber vault CRy as opposed to starting CPM on the C-system at the production site DCx.

In some embodiments, Cyber Protection Manager (CPM) is started in the cyber vault CRy. When CPM is started in the cyber vault, it will detect that it's running on the ODR V-system. When running on a V-system, CPM is configured to support the space-saving cyber protection automation implementation in the MSC-based modality or one of the data drain modalities. CPM for the MSC-based modality is configured to perform all of the required RDF/A management functions and is adapted to run at a system that is remote to the RDF/A R1 devices. Actions affecting the RDF/A R1 devices are sent by CPM through the cyber RDF links to the production storage system DCx, whereas actions affecting the RDF/A R2 devices will be performed locally in the vault storage system. In some embodiments, if the RDF links are to be turned on/off in connection with formation of an airgapped solution, the CPM is configured to control operation of the RDF links to alternately activate and deactivate the RDF links in conformance with the specified airgap schedule.

In some embodiments, Multi Session Consistency (MSC) is used to achieve global consistency between the storage volumes at the production site DCx and the cyber vault CRy. In some embodiments, an MSC group is used for cyber RDF groups, which is defined using cascaded syntax whereby the MSC server at the host at CRy will have MSC_INCLUDE_SESSION statements, with a gatekeeper identifying the vault storage system, and a hop list containing the cyber RDF group to get to the RDF/A R1 production site (DCx).

In some embodiments, a Remote Data Facility (RDF) Host Component (HC) instance is run in the cyber vault CRy, and is configured to manage devices in the vault storage system that will run exclusively at a host with direct channel attachment to the vault storage system (i.e., at CRy). In the OS-based secure vault configuration, this is enforced in RDF/HC software as well as in the operating system of the storage system implementing the cyber vault CRy.

In some embodiments, the Storage Volume Creation and Management System (SVCMS) 190 is configured to manage the cyber protection automation snapsets. One example SVCMS application is referred to as Data Protector for z Systems (zDP) available from Dell™, although other SVCMS applications may be used as well depending on the implementation. In some embodiments, SVCMS 190 runs exclusively at a host with direct channel attachment to the vault storage system (i.e., at CRy). In the OS-based secure vault configuration, this is enforced in SVCMS software as well as in the storage system operating system. In some embodiments, SVCMS is configured to create and optionally link CRy snapsets created from the vault R2 volumes in the vault storage system.

Figure 4:
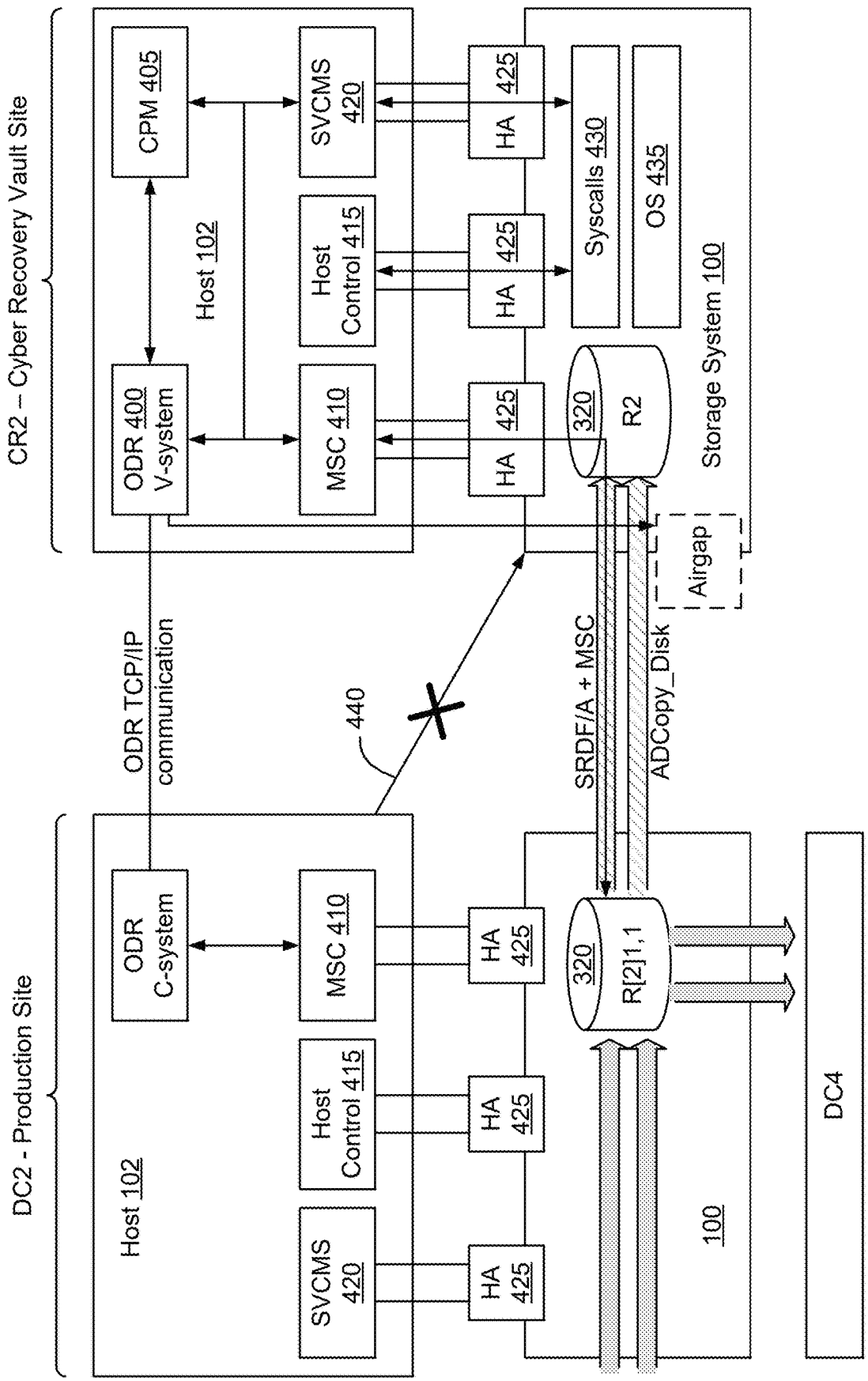
FIG. 4 is a block diagram of a portion of the storage environment of FIG. 3, showing the production site DC2 and cyber vault CR2, and showing software components implemented in the cyber vault to implement a host software based secure physical vault, according to some embodiments.

FIG. 4 shows a host-based cyber protection automation with secure vault implementation, providing cyber protection for the data in the primary region of an RDF/SQAR configuration using a single secure vault site (CR2). When DC2 is in the primary region, cyber protection automation running at CR2 operates to ensure that DC2→CR2 replication is active in RDF/A and globally consistent at the time of CR2 snapset creation. CPM running in the cyber vault creates consistent snapsets at CR2 at a regular pace determined by the state of an airgap or the snap interval or schedule specified by the user. The gray arrows in FIG. 4 represent the production RDF links. The crosshatched arrows in FIG. 4 that extend from DC2→CR2 represent the secure cyber RDF links. As shown in FIG. 4, initial configuration and configuration changes to the cyber protection environment from outside of the cyber vault (arrow 440) are not permitted. In some embodiments, syscalls (arrow 440) received from a host that is not physically connected with a direct channel attachment to the storage system implementing the cyber vault are not processed in the cyber vault. In some embodiments, commands such as CLI commands affecting the cyber protection environment that are received over the RDF links are blocked from being processed in the storage system implementing the cyber vault.

FIG. 5 shows an OS-based cyber protection automation with secure vault implementation, providing cyber protection for the data in the primary region of an RDF/SQAR configuration using a single secure vault site (CR2). On top of the elements shown for the host-based configuration shown in FIG. 4, it shows that the CR2 storage system has the CYB flag that is set by the storage system manufacturer, and the cyber RDF groups are configured with the GCYB flags at both ends. In some embodiments, when the storage system is flagged to be used exclusively in a cyber vault, the flag configures the storage system operating system such that the operating system will not process any CLI commands received over the RDF links or system call, unless the system call or other command is received from a host that is locally physically connected to the storage system.

In some embodiments, as shown in FIG. 4, initial configuration and configuration changes to the cyber protection environment are only implemented by a host that is locally physically connected to the cyber vault CR2. By configuring the cyber protection volumes from hosts that are locally physically connected to the storage system implementing the cyber vault, it is possible to prevent external configuration changes to the cyber protection environment. This prevents a rogue actor from using the RDF links to modify the cyber protection environment, thus eliminating a potential attack facet. In embodiments where the CYB flag is set, the operating system will prevent any syscall that is not from a host that is locally physically connected to the cyber vault from being processed. Thus, when the CYB flag is set, syscalls relating to the cyber protection environment as well as other unrelated syscalls will only be processed if the syscalls are from a host that is locally physically connected to the cyber vault.

As shown in FIG. 4, in some embodiments the cyber vault CR2 includes an ODR V-system 400. V, in this context, stands for "Vault". The ODR V-system manages the overall cyber protection environment. The ODR V-system interacts with a cyber protection manager 405, MSC 410, host control 415, and Storage Volume Creation and Management System (SVCMS) 420. Each of the components, namely ODR 400, CPM 405, MSC 410, Host control 415, and SVCMS 420 are instantiated at one or more host computers that are locally connected to the storage system 100 implementing the cyber vault CRy. Specifically, as shown in FIG. 4, the storage system implementing the cyber vault CRy has a set of host adapters 425 that are used to physically connect one or more host computers to the storage system 100. Applications executing at the physically connected host computer generate system calls (syscalls 430) to instruct the operating system 435 to take particular actions associated with the initial configuration or reconfiguration of the cyber protection environment. In some embodiments, the storage system is configured to distinguish syscalls from hosts that are locally physically connected to the cyber vault, e.g., that are locally generated at attached host adapters, from syscalls from hosts that are not locally physically connected to the cyber vault, e.g., that are generated remotely and routed to the storage system implementing the cyber vault CR2. In some embodiments, host control 415 prevents processing of any syscall related to configuration of the cyber protection environment that is not from a host that is locally physically connected to the cyber vault, thus preventing cyber configuration operations from being initiated from outside of the secure physical vault. For example, as shown in FIG. 4, operations that arrive from outside of the cyber vault such as on link 440 are blocked from being processed in the cyber vault. By requiring the initial configuration of the cyber protection environment and all configuration changes to the cyber protection environment to be made using a host that is locally physically connected to the cyber vault, it is possible to require physical access to the cyber vault CR2, thus adding a layer of security that may not be breached through the exposed RDF links.

As shown in FIG. 4, the production site DCx includes many of the same types of components as the cyber vault CRy. However, while these components are used to manage the remote data forwarding components and configuration at the production site DCx, these components are not locally attached to the storage system implementing the cyber vault CRy, and, accordingly, are not used to configure the cyber protection environment within the cyber vault. For example, MSC at the production site can be used to manage MSC on the gray RDF links when asynchronous RDF is being used to replicate data to/from the production site DC2 over the gray RDF links. However, the MSC process 410 in the cyber vault is used to manage MSC operations on the secure RDF links, with operations that are required to be implemented on the R1 devices being passed from the cyber vault to the production site to be implemented at the production site, and operations that are required to be implemented on the R2 devices local to the cyber vault CR2 being done locally by the MSC process 410 in the cyber vault CR2. Since the manner in which the production site is operating is outside the scope of the invention, and doesn't affect the manner in which the cyber protection environment is configured, additional details related to operation of the production site have been omitted.

As used herein, the term MSC is used to refer to Multi-Session Consistency. MSC is an application 305 that is used to ensure consistency between storage volumes across a remote data forwarding mirror. In the MSC-based modality, the RDF relationship between the source site DCx and the vault site CRy is asynchronous remote data forwarding (RDF/A) with MSC consistency. This allows consistent snapsets to be created by the snapshot subsystem 170 in the cyber vault CRy at a regular pace determined by the state of an airgap or a specified snapshot creation interval or schedule.

In the data drain modality (ADCOPY-DISK), the RDF relationship between the source site and the vault site is ADCOPY-DISK. Specifically, when the mirroring relationship between DCx and CRy is ADCOPY-DISK, the volumes in the cyber vault CRy may be out of synchronization with the volumes at the production site DCx. In some embodiments, ADCOPY-DISK is used to keep the differential between the source DCx and the cyber vault site CRy as small as possible, and is used in situations where the MSC-based modality is not supported (i.e., when the source site is not in the primary region, the data is frozen, the data is not consistent, or the devices already have 2 active RDF/A mirrors). In some embodiments, updates at the source volume R1 are periodically paused to enable the target volume R2 to achieve synchronized state. Upon achievement of synchronized state, a set of snapshots of the target volumes is created in the cyber vault. Updates to the source volumes R1 are then resumed.

According to some embodiments, since snapsets of storage volumes are not required to be created at the production site DCx to implement cyber protection at the cyber vault CRy, it is not necessary to create a versioned data group of storage volumes 320 at the production site DCx. Since snapsets 330 will be created at the cyber vault CRy, however, it is necessary to therefore define a versioned data group 325 at the cyber vault CRy. Optionally, a set of target devices 335 may also be defined in the cyber vault CRy, to allow the volumes 320 of the snapset 330 to be automatically linked to a set of target devices 335 in the cyber vault CRy.

In the MSC-based modality, the RDF groups on the DCx→CRy leg of the data replication facility will have RDF/A active in 2-site MSC mode. In some embodiments, if the cyber protection manager (CPM) 315 determines that the MSC-based modality is supported, Cyber Protection Manager (CPM) application 315 in the vault CRy will manage the RDF/A (MSC) environment on the DCx→CRy leg of the data replication facility.

Figure 6:
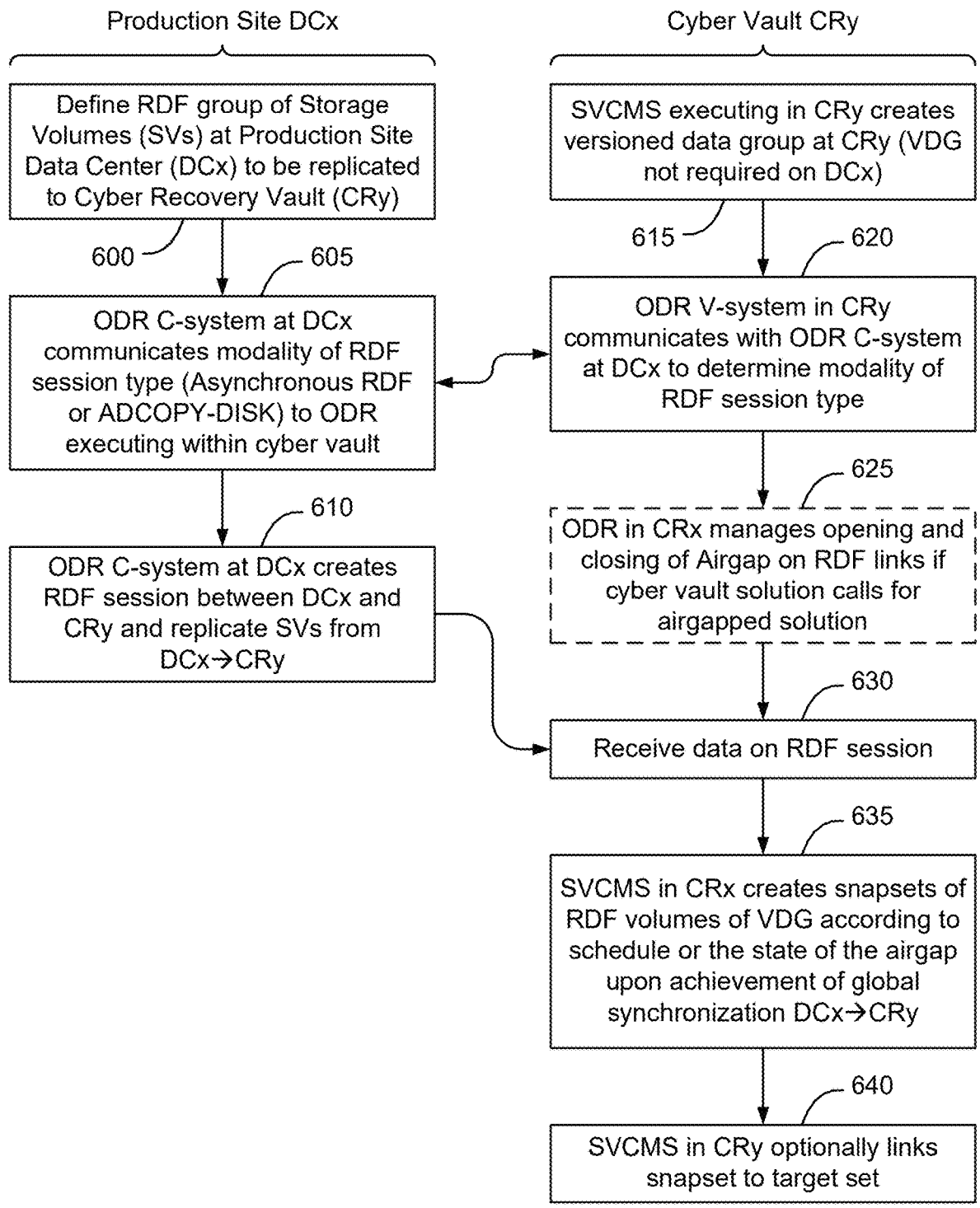
FIG. 6 is a flow chart of a process of implementing a secure physical vault, and showing operations taken by Orchestrated Data Recovery (ODR) applications at both the production site DCx and the Cyber Vault CRy, according to some embodiments.

FIG. 6 is a flow chart of a process of implementing a secure physical vault, and showing operations taken by ODR components at both the production site DCx and the Cyber Vault CRy, according to some embodiments. As shown in FIG. 6, at the production site DCx a group of storage volumes is defined as part of an RDF group at the production site DCx that should be replicated to a cyber vault (block 600). Orchestrated Disaster Recovery (ODR) at the production site implements RDF forwarding of updates to the storage volumes to the cyber vault CRy using one of a plurality of available reproduction modalities. Example data reproduction modalities include, for example, asynchronous remote data forwarding and ADCOPY-DISK. ODR at the production site and a corresponding ODR in the cyber vault CRy exchange messages related to the selected RDF modality, to thus enable the cyber vault CRy to know the type of modality being used to replicate data on the RDF links (block 605). Knowing the selected RDF modality enables the cyber vault to determine the type of operations required to be implemented on the RDF facility to ensure global consistency of the storage volumes in the cyber vault required to create consistent snapsets of the storage volumes within the cyber vault. The ODR at the production site DCx creates the RDF session between the production site DCx and the cyber vault CRy and replicates the storage volumes from the production site DCx to the cyber vault CRy (block 610).

Within the cyber vault, the Storage Volume Creation And Management System (SVCMS) creates a versioned data group of the storage volumes associated with the RDF facility (block 615). Creation of a versioned data group enables snapsets of the set of storage volumes to be simultaneously created whenever global consistency is achieved between the storage volumes in the cyber vault CRy and the corresponding storage volumes in the production site DCx. Because snapsets are not required to be created at the production site, a versioned data group is not required to be created at the production site DCx.

ODR in the cyber vault CRy communicates with the ODR at the production site DCx to determine the RDF modality being used to replicate data of the storage volumes on the RDF links (block 620). Optionally, as shown using the dashed lines, ODR in the cyber vault manages opening and closing of an airgap on the RDF links if the cyber vault solution calls for an airgapped solution to partially isolate the cyber vault from the production site DCx (block 625).

The cyber vault CRy continuously receives data on the RDF links (in a non-airgapped environment) or periodically receives data on the RDF links (in an airgapped environment) (block 630). SVCMS in the cyber vault CRy creates snapsets of the storage volumes included in the versioned data group periodically when the storage volumes of the cyber vault are determined to be globally consistent with the corresponding volumes of the production site (block 635). In some embodiments, SVCMS creates the snapshots periodically according to a schedule specified in the cyber protection environment configuration. In some embodiments the SVCMS creates snapshots in determination of the airgap schedule. Optionally, depending on the cyber protection environment configuration, when snapsets are created the snapshots of a given snapset may be linked to a target setoff devices in the cyber vault CRy (block 640).

Figure 7:
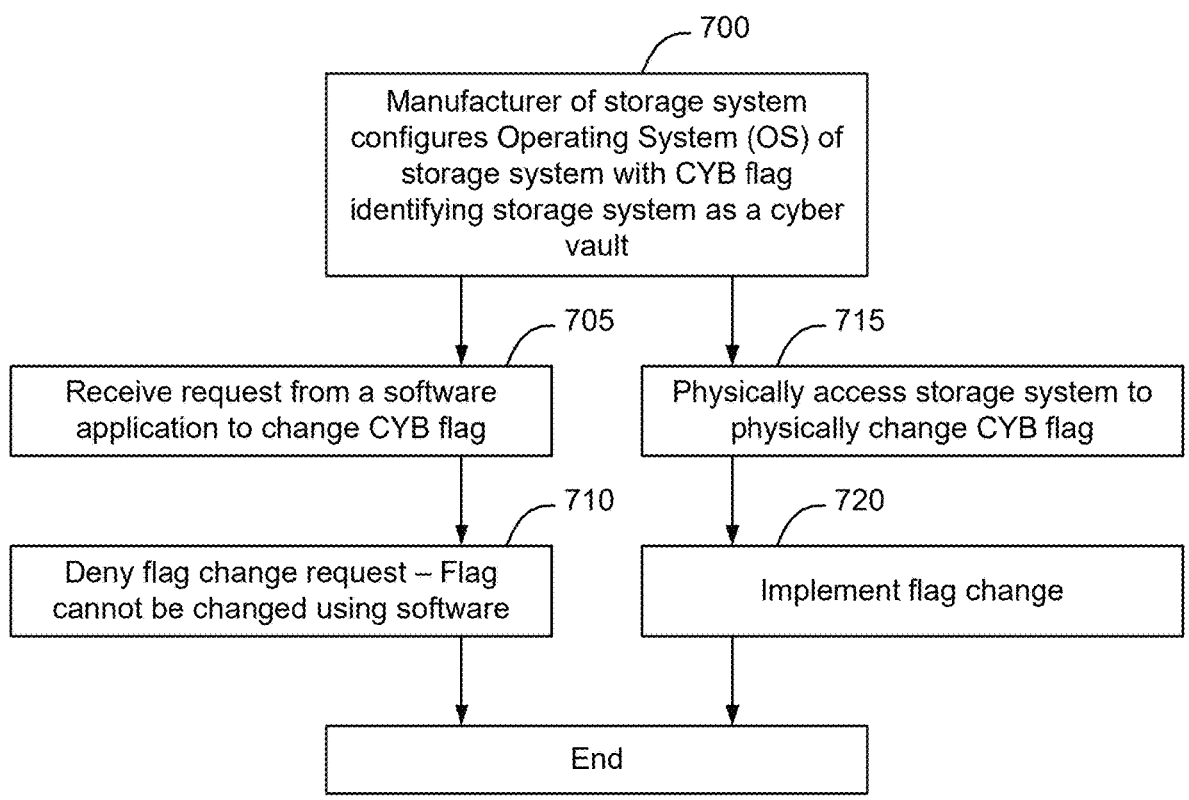
FIG. 7 is a flow chart of a process of configuring and modifying a CYB flag on a storage system to implement an operating system based secure physical vault, according to some embodiments.

FIG. 7 is a flow chart of a process of configuring and modifying a CYB flag on a storage system to implement an operating system based secure physical vault, according to some embodiments. As shown in FIG. 7, in some embodiments a cyber flag CYB is set at the factory when the storage system is first manufactured (block 700). Alternatively, a deployed storage system may be accessed to have the cyber flag physically set to configure the storage system to implement a cyber vault. In some embodiments, when a cyber flag is set, the cyber flag specifies to the operating system that all syscalls and other commands such as CLI commands received over the RDF links, both those that are unrelated to cyber protection and those that are related to initial configuration of the cyber protection environment and configuration changes to the cyber protection environment, are only processed if they are received from a host that is locally physically connected to the cyber vault. Hence, unrelated syscalls and commands, as well as syscalls and commands related to cyber protection configuration, will not be processed unless the operating system determines that they were from a host computer that is locally physically connected to the storage system implementing the cyber vault, such as from a host having a local physical connection to one of the host adapters on the storage system.

As shown in FIG. 7, in response to a software request to reset the CYB flag (block 705) the storage system will deny the flag change request (block 710). Specifically, in some embodiments the CYB flag is not able to be set or reset using software. Accordingly, even if the CYB flag change request is received locally from a host that is locally physically connected to the storage system, the software request will be denied (block 710). There are instances where a storage system that was initially designated to be used as a cyber vault CRy may need to be repurpose for use in another context. Accordingly, as shown in FIG. 7, in some embodiments it is possible to physically access the storage system to physically change the CYB flag. For example, a switch on a printed circuit board of the storage system may be accessed and physically changed to reconfigure the CYB flag on the storage system (block 715). In response to the physical access, the CYB flag is changed (block 720).

Figure 8:
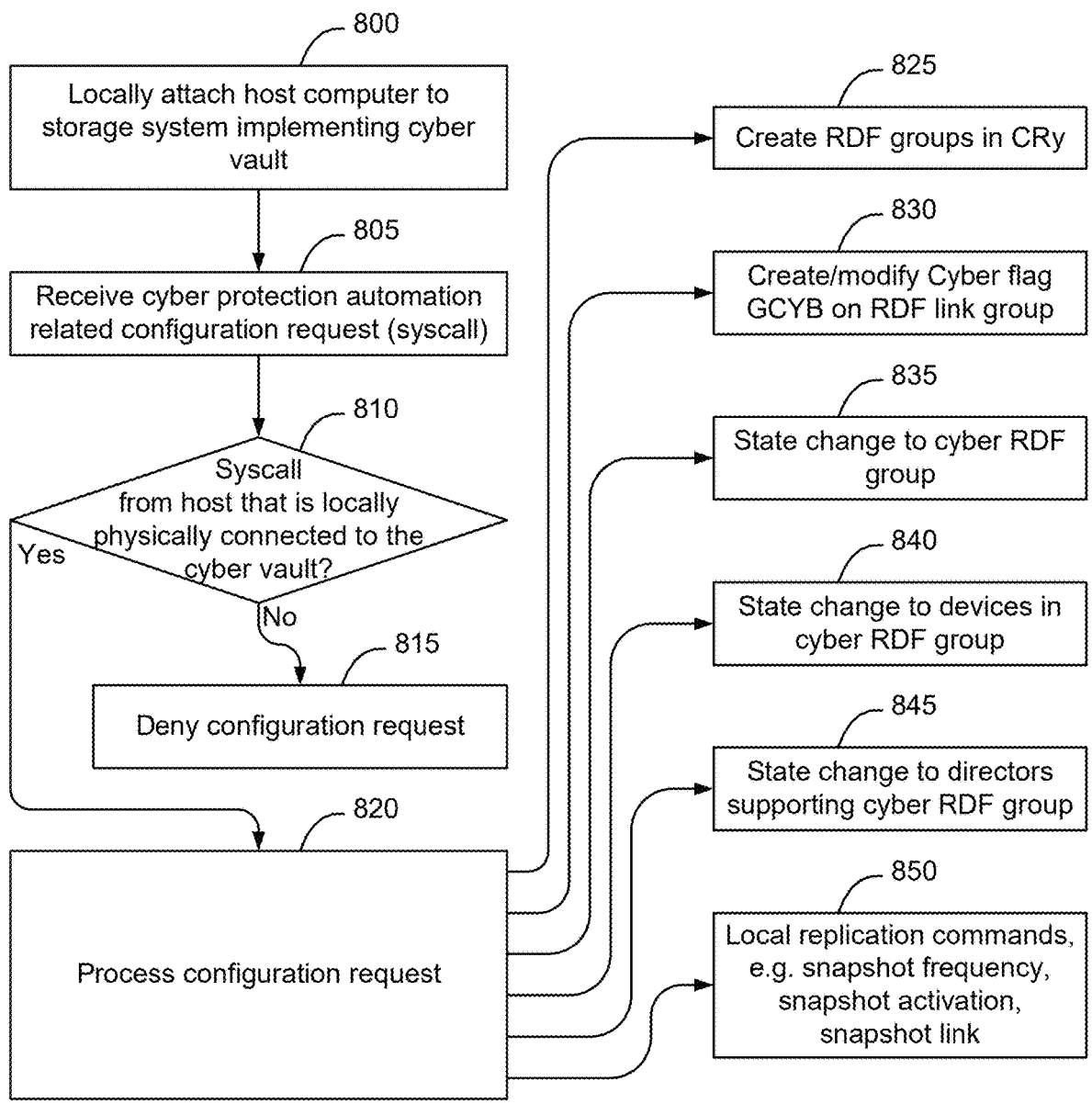
FIG. 8 is a flow chart of a process of implementing cyber protection automation configuration changes on cyber protection automation components within a secure physical vault, according to some embodiments.

FIG. 8 is a flow chart of a process of implementing cyber protection automation configuration changes on cyber protection automation components within a secure physical vault, according to some embodiments. As shown in FIG. 8, in some embodiments a host computer such as a laptop computer is locally physically attached to a storage system implementing the cyber vault (block 800). In some embodiments, the connection from the host computer to the storage system implementing the cyber vault CRy is effected by connecting a computer cable from the host computer to a host adapter in the cyber vault CRy storage system.

In some embodiments a local physical connection between a host and the storage system implementing the cyber vault is not considered "physical" if implemented using a wireless communication technology. Hence, in some embodiments, communication between a host and the storage system implementing the cyber vault over Bluetooth, WiFi, cellular, or other wireless communication technology is not considered a local "physical" connection between the host and the cyber vault.

A RDF related configuration request (syscall) is then received by the cyber vault CRy (block 805). In response to receipt of the syscall related to configuration of the cyber protection environment, the cyber vault CRy determines if the syscall was from a host that is locally physically connected to the cyber vault (block 810). In response to a determination that the syscall was not from a host that is locally physically connected to the cyber vault (a determination of NO at block 810) the configuration request is denied and not processed in the cyber vault CRy (block 815). This prevents external attempts at initial configuration and configuration changes to the cyber protection environment from being made from outside the cyber vault CRy. In response to a determination that the syscall originated from a host that is locally physically connected to the storage system implementing the cyber vault CRy (a determination of YES at block 810) the configuration request is allowed and processed by the operating system of the storage system implementing the cyber vault (block 820). Specifically, the cyber protection environment configuration request is processed to enable initial configuration or configuration changes to the cyber protection environment by the host that is locally physically connected to the storage system. Example cyber protection environment configuration actions shown in FIG. 8 include:

creating one or more RDF groups in the cyber vault (block 825)

creating or modifying a cyber flag GCYB on one or more of the RDF groups (block 830)

implementing a state change to one or more of the cyber RDF groups (block 835)

implementing a state change to one or more of devices in the RDF group (block 840)

implementing a state change to one or more of the directors supporting the RDF group (block 845)

implementing one or more local replication commands (block 850). Example local replication commands might include, for example, changing the frequency with which snapsets are created, specifying activation of a particular snapshot, linking a snapshot to a device, etc.

There are many cyber protection environment configuration actions that might be requested, and the collection of example actions in FIG. 8 is merely intended to show some possible actions.

As noted above, in some embodiments a host computer must be locally physically connected to a storage system implementing a cyber vault CRy to make configuration changes to the cyber protection environment supported by the cyber vault. If the same host computer is also simultaneously connected to another storage system, such as to the production system, this may result in diminished security provided by the secure cyber vault solution described herein. According to some embodiments, the ODR running in the cyber vault is configured to detect hosts that are connected to both the cyber vault and to the production site to generate alerts when this type of dual connectivity has occurred.

In some embodiments, the ODR in the cyber vault detects hosts connected to the cyber vault and ODR at the production site detects hosts connected to the production site. A comparison between the known hosts is then implemented to determine if the same host is connected to both the cyber vault and to the production site. In response to a determination that no host is identified as being connected to both the production site and the cyber vault there is no determined possible security breach. In response to a determination that one or more of the host are identified as being connected to both the production site and the cyber vault, the identified one or more hosts present a possible security breach. Accordingly, the ODR in the cyber vault issues a security alert identifying the host and specifying that the same host should not be locally connected to the cyber vault while also being externally accessible.

Figure 9:
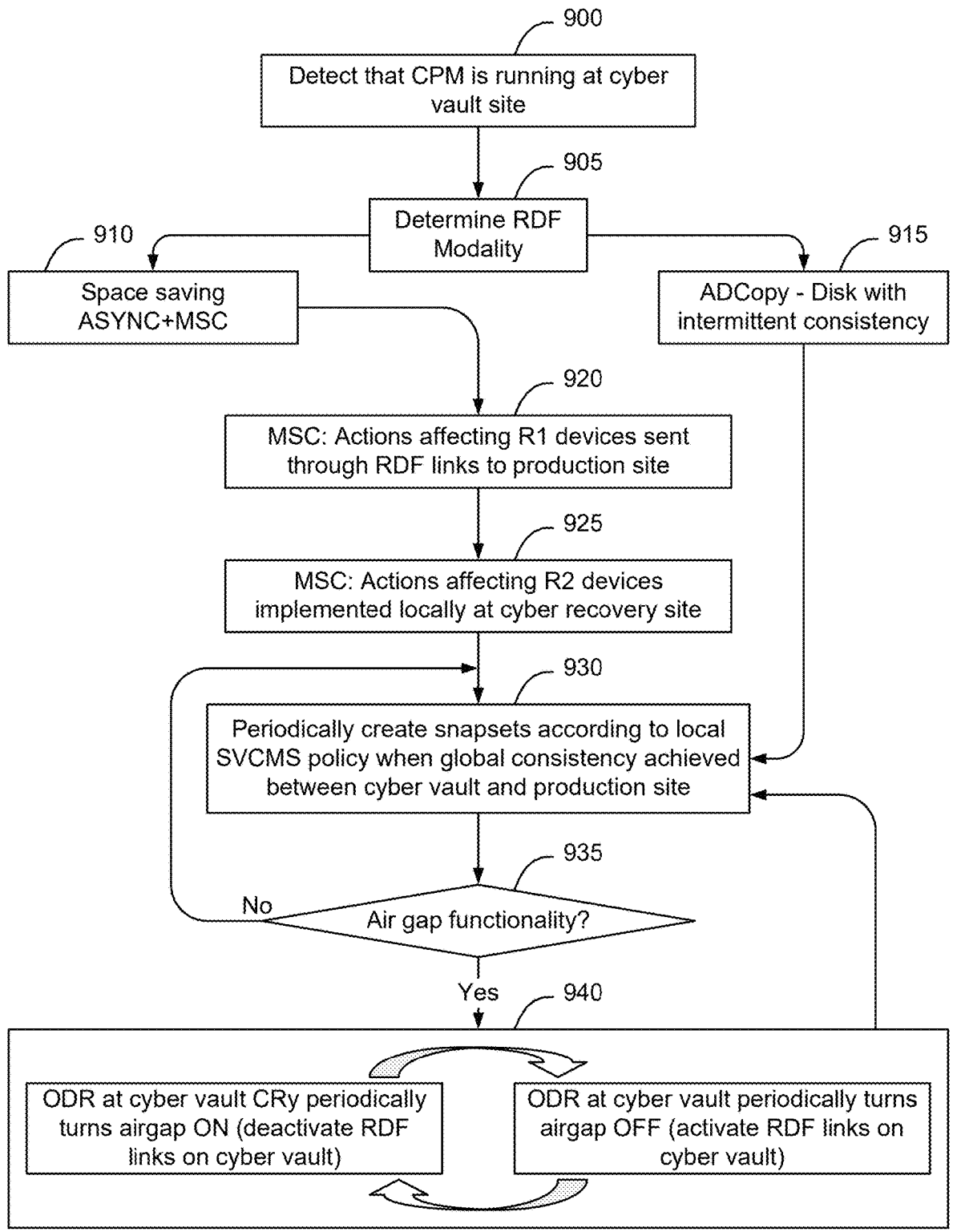
FIG. 9 is a flow chart of a process implemented by a cyber protection manager of the Orchestrated Data Recovery (ODR) application to protect storage volumes within a secure physical vault, according to some embodiments.

FIG. 9 is a flow chart of a process implemented by a cyber protection manager of the Orchestrated Disaster Recovery (ODR) application to protect storage volumes within a secure physical vault, according to some embodiments. As shown in FIG. 9, when the cyber protection manager detects that it is running in a cyber vault site (block 900), the cyber protection manager determines the RDF modality in use to transfer data into the cyber vault (block 905). As shown in FIG. 9, in some embodiments the modality is either space saving Asynchronous RDF with Multi-Session Consistency (MSC) (block 910), or ADCOPY_DISK (block 915). As used herein, the term "space saving" is used to reference the notion that snapshots of the protected storage volumes are initially created within the cyber vault, rather than being first created within the production site. If the modality is RDF/A+MSC, an MSC application executing in the cyber vault implements the MSC operations on the RDF facility. Specifically, as shown in FIG. 9, MSC actions affecting R1 devices (on the production site DCx) are sent through the RDF links to the production site (block 920). MSC actions affecting the R2 devices (in the cyber vault CRy) are implemented locally in the cyber vault (block 925). If the modality is ADCOPY_DISK, MSC is not required to be implemented on the RDF facility (block 915). The ODR application periodically creates snapsets according to the local snapshot (SVCMS) policy when global consistency is achieved between the cyber vault and the production site (block 930).

The ODR application also determines if creation of an airgap is required by the cyber protection environment configuration (block 935). In response to a determination that an airgap is not required (a determination of NO at block 935), no airgap is created by the ODR application. In response to a determination that an airgap is required (a determination of YES at block 935), the ODR application in the cyber vault periodically turns the airgap on by deactivating the RDF links in the cyber vault site, and periodically turns the airgap off by activating the RDF links in the cyber vault site (block 940).

Figure 10:
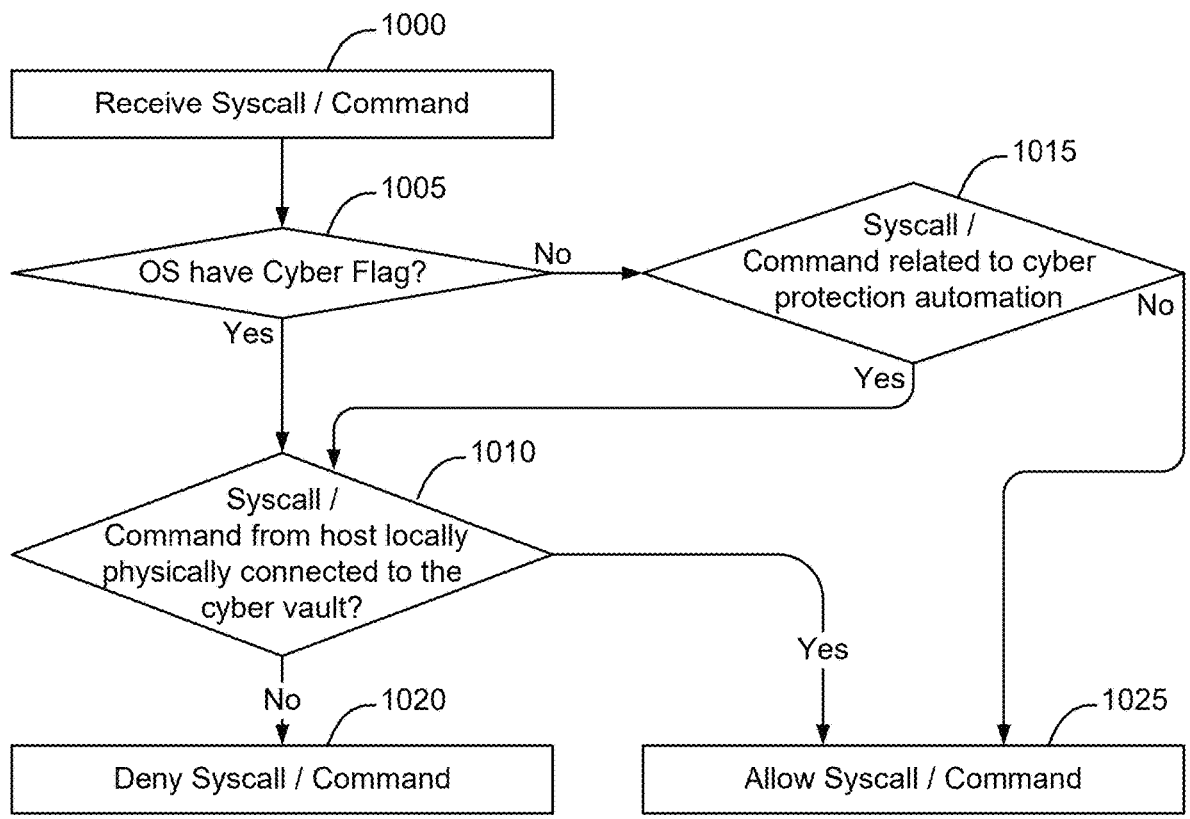
FIG. 10 is a flow chart of a process of implementing cyber protection automation with a secure physical vault, according to some embodiments.

FIG. 10 is a flow chart of a process of implementing cyber protection automation with a secure physical vault, according to some embodiments. As shown in FIG. 10, in some embodiments when a syscall or other command is received (block 1000), a determination is made as to whether the operating system includes a cyber flag indicating that the storage system is to be used only to implement the secure physical vault (block 1005). In some embodiments, when the operating system is flagged to identify the storage system as being used to implement a secure physical vault, only syscalls and commands that are received from a host that is locally physically connected to the cyber vault will be processed.

Accordingly, in response to a determination that the operating system includes a cyber flag indicating that the storage system is to be used only to implement the secure physical vault (a determination of YES at block 1005), a determination is made as to whether the syscall/command was received from a host that is locally physically connected to the cyber vault (block 1010). In response to a determination that the syscall/command was not received from a host that is locally physically connected to the cyber vault (a determination of NO at block 1010), the syscall/command is denied (block 1020). In response to a determination that the syscall/command was received from a host that is locally physically connected to the cyber vault (a determination of YES at block 1010), the syscall/command is allowed (block 1025).

In some embodiments, if the operating system of the storage system is not flagged to indicate that the storage system can only be used as a cyber vault, the secure cyber vault will still prevent execution of syscalls/commands related to cyber protection automation that are not received from a host that is locally physically connected to the cyber vault. Accordingly, as shown in FIG. 10k in some embodiments, in response to a determination that the operating system does not include a cyber flag indicating that the storage system is to be used only to implement the secure physical vault (a determination of NO at block 1005), a determination is made as to whether the syscall/command is related to cyber protection automation (block 1015). In response to a determination that the syscall/command is not related to cyber protection automation (a determination of NO at block 1015), the syscall/command is allowed (block 1025). In response to a determination that the syscall/command is related to cyber protection automation (a determination of YES at block 1015), a determination is made as to whether the syscall/command was received from a host that is locally physically connected to the cyber vault (block 1010). In response to a determination that the syscall/command was not received from a host that is locally physically connected to the cyber vault (a determination of NO at block 1010), the syscall/command is denied (block 1020). In response to a determination that the syscall/command was received from a host that is locally physically connected to the cyber vault (a determination of YES at block 1010), the syscall/command is allowed (block 1025).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing cyber protection automation using a secure cyber vault, comprising:
    receiving an instruction by a storage system implementing the secure cyber vault;
    determining, by the storage system, whether a flag is set on the storage system designating the storage system as configured to implement the secure cyber vault;
    determining, by the storage system, an origin of the instruction, the origin of the instruction specifying whether the instruction was received from a host that is locally physically attached to the storage system or not locally physically attached to the storage system;
    in response to a determination that the flag is set on the storage system that designates the storage system as configured to implement the secure cyber vault, and in response to determination that the origin of the instruction was from the host that is not locally physically attached to the storage system, denying the instruction and not processing the instruction by the storage system; and
    in response to a determination that the flag is set on the storage system that designates the storage system as configured to implement the secure cyber vault, and in response to determination that the origin of the instruction was from the host that is locally physically attached to the storage system, allowing the instruction and processing the instruction by the storage system;
    wherein the instruction received by the cyber vault is one of:
        a system call (syscall); and
        a Command Line Interface (CLI) command received on a Remote Data Forwarding link.

2. The method of claim 1, wherein the instruction is related to creation or modification of a cyber protection environment configuration of the cyber protection automation provided by the secure cyber vault.

3. The method of claim 1, wherein the instruction is unrelated to creation or modification of a cyber protection environment configuration of the cyber protection automation provided by the secure cyber vault.

4. The method of claim 1, wherein, in response to a determination that the flag is not set on the storage system that designates the storage system as configured to implement the secure cyber vault, the method further comprising:
    determining whether the instruction is related to creation or modification of a cyber protection environment configuration of the cyber protection automation provided by the secure cyber vault;
    in response to a determination that the instruction is related to creation or modification of the cyber protection environment configuration of the cyber protection automation provided by the secure cyber vault, and in response to determination that the origin of the instruction was from the host that is locally physically attached to the storage system, allowing the instruction and processing the instruction by the storage system;
    in response to a determination that the instruction is related to creation or modification of the cyber protection environment configuration of the cyber protection automation provided by the secure cyber vault, and in response to determination that the origin of the instruction was not from the host that is locally physically attached to the storage system, denying the instruction and not processing the instruction by the storage system; and
    in response to a determination that the instruction is not related to creation or modification of the cyber protection environment configuration of the cyber protection automation provided by the secure cyber vault, allowing the instruction and processing the instruction by the storage system.

5. The method of claim 1, wherein determining, by the storage system, the origin of the instruction comprises determining whether the host is connected to the storage system using a physical cable or a wireless communication technology, and wherein the host will be determined to be locally physically attached to the storage system when the host is connected to the storage system using the physical cable, and will be determined to be not locally physically attached to the storage system when the host is connected to the storage system using the wireless communication technology.

6. The method of claim 1, wherein the flag is not able to be changed by software.

7. The method of claim 1, further comprising alternately opening and closing an airgap on one or more remote data forwarding links by turning the remote data forwarding links online and offline, respectively, by software executing on the storage system implementing the cyber vault.

8. The method of claim 1, further comprising implementing a cyber protection environment by software executing on the storage system implementing the cyber vault according to the configuration of the cyber protection automation provided by the secure cyber vault.

9. A system for cyber protection automation using a secure cyber vault, comprising:
    one or more processors and one or more storage devices storing instructions that are operable, when executed by the one or more processors, to cause the one or more processors to perform operations comprising:
    receiving an instruction by a storage system implementing the secure cyber vault;
    determining, by the storage system, whether a flag is set on the storage system designating the storage system as configured to implement the secure cyber vault;
    determining, by the storage system, an origin of the instruction, the origin of the instruction specifying whether the instruction was received from a host that is locally physically attached to the storage system or not locally physically attached to the storage system;
    in response to a determination that the flag is set on the storage system that designates the storage system as configured to implement the secure cyber vault, and in response to determination that the origin of the instruction was from the host that is not locally physically attached to the storage system, denying the instruction and not processing the instruction by the storage system; and in response to a determination that the flag is set on the storage system that designates the storage system as configured to implement the secure cyber vault, and in response to determination that the origin of the instruction was from the host that is locally physically attached to the storage system, allowing the instruction and processing the instruction by the storage system; and alternately opening and closing an airgap on one or more remote data forwarding links by turning the remote data forwarding links online and offline, respectively, by software executing on the storage system implementing the cyber vault.

10. The system of claim 9, wherein the instruction received by the cyber vault is a system call (syscall).

11. The system of claim 9, wherein the instruction received by the cyber vault is a Command Line Interface (CLI) command received on a Remote Data Forwarding link.

12. The system of claim 9, wherein the instruction is related to creation or modification of a cyber protection environment configuration of the cyber protection automation provided by the secure cyber vault.

13. The system of claim 9, wherein the instruction is unrelated to creation or modification of a cyber protection environment configuration of the cyber protection automation provided by the secure cyber vault.

14. The system of claim 9, wherein, in response to a determination that the flag is not set on the storage system that designates the storage system as configured to implement the secure cyber vault, the method further comprising:

determining whether the instruction is related to creation or modification of a cyber protection environment configuration of the cyber protection automation provided by the secure cyber vault;

in response to a determination that the instruction is related to creation or modification of the cyber protection environment configuration of the cyber protection automation provided by the secure cyber vault, and in response to determination that the origin of the instruction was from the host that is locally physically attached to the storage system, allowing the instruction and processing the instruction by the storage system;

in response to a determination that the instruction is related to creation or modification of the cyber protection environment configuration of the cyber protection automation provided by the secure cyber vault, and in response to determination that the origin of the instruction was not from the host that is locally physically attached to the storage system, denying the instruction and not processing the instruction by the storage system; and in response to a determination that the instruction is not related to creation or modification of the cyber protection environment configuration of the cyber protection automation provided by the secure cyber vault, allowing the instruction and processing the instruction by the storage system.

15. The system of claim 9, wherein determining, by the storage system, the origin of the instruction comprises determining whether the host is connected to the storage system using a physical cable or a wireless communication technology, and wherein the host will be determined to be locally physically attached to the storage system when the host is connected to the storage system using the physical cable, and will be determined to be not locally physically attached to the storage system when the host is connected to the storage system using the wireless communication technology.

16. The system of claim 9, wherein the flag is not able to be changed by software.

17. The system of claim 9, further comprising implementing a cyber protection environment by the software executing on the storage system implementing the cyber vault according to the configuration of the cyber protection automation provided by the secure cyber vault.

18. A system for cyber protection automation using a secure cyber vault, comprising:

one or more processors and one or more storage devices storing instructions that are operable, when executed by the one or more processors, to cause the one or more processors to perform operations comprising:

receiving an instruction by a storage system implementing the secure cyber vault;

determining, by the storage system, whether a flag is set on the storage system designating the storage system as configured to implement the secure cyber vault;

determining, by the storage system, an origin of the instruction, the origin of the instruction specifying whether the instruction was received from a host that is locally physically attached to the storage system or not locally physically attached to the storage system;

in response to a determination that the flag is set on the storage system that designates the storage system as configured to implement the secure cyber vault, and in response to determination that the origin of the instruction was from the host that is not locally physically attached to the storage system, denying the instruction and not processing the instruction by the storage system; and in response to a determination that the flag is set on the storage system that designates the storage system as configured to implement the secure cyber vault, and in response to determination that the origin of the instruction was from the host that is locally physically attached to the storage system, allowing the instruction and processing the instruction by the storage system; and implementing a cyber protection environment by software executing on the storage system implementing the cyber vault according to the configuration of the cyber protection automation provided by the secure cyber vault.

\* \* \* \* \*